(12) United States Patent
Shah et al.

(10) Patent No.: US 11,861,342 B2
(45) Date of Patent: Jan. 2, 2024

(54) ENHANCED CLOUD-COMPUTING ENVIRONMENT DEPLOYMENT

(71) Applicant: MicroStrategy Incorporated, Vienna, VA (US)

(72) Inventors: Jay Indravadan Shah, Aldie, VA (US); Jignesh Sura, Broadlands, VA (US); Jehan Jayant Sethna, Vienna, VA (US); Clayton Myers, Oak Hill, VA (US); Timothy Lang, McLean, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 17/587,845

(22) Filed: Jan. 28, 2022

(65) Prior Publication Data

US 2023/0244466 A1  Aug. 3, 2023

(51) Int. Cl.
*G06F 8/61* (2018.01)
*H04L 67/10* (2022.01)
*H04L 67/00* (2022.01)
*G06F 9/54* (2006.01)

(52) U.S. Cl.
CPC .............. *G06F 8/63* (2013.01); *G06F 9/541* (2013.01); *H04L 67/10* (2013.01); *H04L 67/34* (2013.01)

(58) Field of Classification Search
None
See application file for complete search history.

(56) References Cited

U.S. PATENT DOCUMENTS

| | | |
|---|---|---|
| 6,334,158 B1 | 12/2001 | Jennyc et al. |
| 6,339,795 B1 | 1/2002 | Narurkar et al. |
| 6,691,245 B1 | 2/2004 | DeKoning |
| 7,454,427 B2 | 11/2008 | Jackson |
| 7,457,248 B1 | 11/2008 | Ali et al. |
| 7,784,049 B1 | 8/2010 | Gandler |
| 7,917,617 B1 | 3/2011 | Ponnapur et al. |

(Continued)

OTHER PUBLICATIONS bmc.com [online], "Introduction to Kubernetes Helm Charts," Apr. 10, 2020, retrieved on Aug. 30, 2022, retrieved from URL <https://www.bmc.com/blogs/kubernetes-helm-charts/>, 4 pages.

(Continued)

*Primary Examiner* — Marina Lee
(74) *Attorney, Agent, or Firm* — Fish & Richardson P.C.

(57) ABSTRACT

Methods, systems, and apparatus, including computer programs encoded on computer-storage media, for enhanced cloud computing deployment. In some implementations, a computer system provides a repository comprising (i) deployment tools configured to provide a deployment application programming interface (API), (ii) a set of container files configured to operate together to provide a server environment, and (iii) configuration data for the container images. The computer system can provide a deployment workflow package that, when invoked for a cloud computing account of the customer, is configured to retrieve the container files, configuration data, and deployment tools from the repository over a communication network and store the retrieved items in the cloud computing account. The deployment workflow package is also configured to run the deployment tools and create deployment infrastructure in the cloud computing account.

20 Claims, 4 Drawing Sheets

(56) References Cited

U.S. PATENT DOCUMENTS

| | | |
|---|---|---|
| 8,135,751 B2 | 3/2012 | Engquist et al. |
| 8,140,624 B2 | 3/2012 | Gingell et al. |
| 8,238,913 B1 | 8/2012 | Bhattacharyya et al. |
| 8,285,681 B2 | 10/2012 | Prahlad et al. |
| 8,572,138 B2 | 10/2013 | Sundar et al. |
| 8,595,331 B2 | 11/2013 | Henseler et al. |
| 8,954,557 B2 | 2/2015 | Gusev et al. |
| 8,959,223 B2 | 2/2015 | Sloma et al. |
| 9,189,294 B2 | 11/2015 | Considine et al. |
| 9,270,449 B1 | 2/2016 | Tribble et al. |
| 9,367,305 B1 | 6/2016 | Kumar et al. |
| 9,674,294 B1 | 6/2017 | Gonthier et al. |
| 9,767,312 B2 | 9/2017 | Sahoo et al. |
| 9,928,210 B1 | 3/2018 | Zhang et al. |
| 9,959,104 B2 | 5/2018 | Chen et al. |
| 9,965,261 B2 | 5/2018 | Chen et al. |
| 9,986,427 B2 | 5/2018 | Kimpe |
| 10,002,247 B2 | 6/2018 | Suarez et al. |
| 10,007,509 B1 | 6/2018 | Quershi et al. |
| 10,101,985 B1 | 10/2018 | Prakash et al. |
| 10,120,907 B2 | 11/2018 | De Castro et al. |
| 10,135,837 B2 | 11/2018 | Lewis et al. |
| 10,169,023 B2 | 1/2019 | Ciano et al. |
| 10,169,028 B2 | 1/2019 | Htay |
| 10,191,778 B1 | 1/2019 | Yang et al. |
| 10,225,335 B2 | 3/2019 | Fu et al. |
| 10,237,118 B2 | 3/2019 | Du et al. |
| 10,241,778 B2 | 3/2019 | Emeis et al. |
| 10,244,034 B2 | 3/2019 | Joshi et al. |
| 10,261,782 B2 | 4/2019 | Suarez et al. |
| 10,310,949 B1 | 6/2019 | Chakraborty et al. |
| 10,318,280 B2 | 6/2019 | Islam et al. |
| 10,356,214 B2 | 7/2019 | Joshi et al. |
| 10,389,582 B1 | 8/2019 | Fakhouri et al. |
| 10,389,598 B2 | 8/2019 | Padala et al. |
| 10,528,367 B1 | 1/2020 | Liu et al. |
| 10,552,774 B2 | 2/2020 | Shih et al. |
| 10,628,228 B1 | 4/2020 | Theunissen et al. |
| 10,671,368 B2 | 6/2020 | Brealey et al. |
| 10,691,514 B2 | 6/2020 | McClory et al. |
| 10,698,742 B2 | 6/2020 | Barsness et al. |
| 10,708,082 B1 | 7/2020 | Bakiaraj et al. |
| 10,725,775 B2 | 7/2020 | Suarez et al. |
| 10,979,859 B2 | 4/2021 | Botti et al. |
| 11,023,270 B2 | 6/2021 | Mahajan et al. |
| 11,029,977 B2 | 6/2021 | Baneva et al. |
| 11,106,455 B2 | 8/2021 | Myers et al. |
| 11,277,471 B2 | 3/2022 | Brandwine et al. |
| 11,288,053 B2 | 3/2022 | Myers et al. |
| 2002/0157089 A1 | 10/2002 | Patel et al. |
| 2005/0060722 A1 | 3/2005 | Rochette et al. |
| 2008/0109448 A1 | 5/2008 | Aboel-Nil et al. |
| 2008/0216056 A1 | 9/2008 | Bate et al. |
| 2008/0243660 A1 | 10/2008 | Amemiya et al. |
| 2009/0070462 A1 | 3/2009 | Saenz et al. |
| 2012/0117620 A1 | 5/2012 | Cassidy |
| 2013/0080514 A1 | 3/2013 | Gupta et al. |
| 2013/0339299 A1 | 12/2013 | Muller et al. |
| 2014/0020048 A1 | 1/2014 | Snodgrass |
| 2014/0089033 A1 | 3/2014 | Snodgrass |
| 2015/0019488 A1 | 1/2015 | Balch et al. |
| 2015/0135185 A1 | 5/2015 | Sirota et al. |
| 2015/0319192 A1 | 11/2015 | Cabrera et al. |
| 2015/0326432 A1 | 11/2015 | Fujie et al. |
| 2015/0373097 A1 | 12/2015 | Konkus et al. |
| 2016/0044040 A1 | 2/2016 | Caffary, Jr. |
| 2016/0055067 A1 | 2/2016 | Bensinger |
| 2016/0139887 A1 | 5/2016 | Pudiyapura et al. |
| 2016/0162277 A1 | 6/2016 | Fenzl et al. |
| 2016/0335106 A1 | 11/2016 | Behere et al. |
| 2016/0335108 A1 | 11/2016 | Ryu et al. |
| 2016/0350205 A1 | 12/2016 | Acharya et al. |
| 2017/0090972 A1 | 3/2017 | Ryu et al. |
| 2017/0093742 A1 | 3/2017 | Cropper et al. |
| 2017/0093923 A1 | 3/2017 | Duan |
| 2017/0147319 A1 | 5/2017 | Riek et al. |
| 2017/0154017 A1 | 6/2017 | Kristiansson et al. |
| 2017/0177860 A1 | 6/2017 | Suarez et al. |
| 2017/0185488 A1 | 6/2017 | Kumarasamy et al. |
| 2017/0223117 A1 | 8/2017 | Messerli et al. |
| 2017/0300311 A1 | 10/2017 | Lopez et al. |
| 2017/0315795 A1 | 11/2017 | Keller |
| 2018/0013616 A1 | 1/2018 | Abadi et al. |
| 2018/0060132 A1 | 3/2018 | Maru et al. |
| 2018/0075086 A1 | 3/2018 | Yam et al. |
| 2018/0088926 A1 | 3/2018 | Abrams |
| 2018/0088935 A1 | 3/2018 | Church et al. |
| 2018/0095778 A1 | 4/2018 | Aydelott et al. |
| 2018/0095973 A1 | 4/2018 | Huang et al. |
| 2018/0136931 A1 | 5/2018 | Hendrich et al. |
| 2018/0157516 A1 | 6/2018 | Kristiansson et al. |
| 2018/0173502 A1 | 6/2018 | Biskup et al. |
| 2018/0173522 A1 | 6/2018 | Hamill et al. |
| 2018/0205652 A1 | 7/2018 | Saxena |
| 2018/0285199 A1 | 10/2018 | Mitkar et al. |
| 2018/0285210 A1 | 10/2018 | Mitkar et al. |
| 2018/0285353 A1 | 10/2018 | Rao et al. |
| 2018/0302335 A1* | 10/2018 | Gao ................... H04L 43/16 |
| 2018/0321993 A1* | 11/2018 | McClory ............ H04L 41/5041 |
| 2018/0341471 A1 | 11/2018 | Stefanov et al. |
| 2018/0373885 A1 | 12/2018 | Arad et al. |
| 2019/0034313 A1 | 1/2019 | Vedurumudi et al. |
| 2019/0050680 A1 | 2/2019 | Waugh et al. |
| 2019/0095254 A1 | 3/2019 | Rao |
| 2019/0109857 A1 | 4/2019 | Caffary, Jr. |
| 2019/0123956 A1 | 4/2019 | Satapathy et al. |
| 2019/0132329 A1 | 5/2019 | Verberkt et al. |
| 2019/0163559 A1 | 5/2019 | Takahashi et al. |
| 2019/0208031 A1 | 7/2019 | Bennet et al. |
| 2019/0230130 A1 | 7/2019 | Beckman et al. |
| 2019/0235897 A1 | 8/2019 | Goel |
| 2019/0236844 A1 | 8/2019 | Balasian et al. |
| 2019/0260716 A1 | 8/2019 | Lemer |
| 2019/0278669 A1 | 9/2019 | Mueller-Wicke et al. |
| 2019/0303541 A1 | 10/2019 | Reddy et al. |
| 2019/0354389 A1 | 11/2019 | Du et al. |
| 2019/0392045 A1 | 12/2019 | De Lima Junior et al. |
| 2020/0067763 A1 | 2/2020 | Vytla |
| 2020/0099773 A1 | 3/2020 | Myers et al. |
| 2020/0356806 A1 | 11/2020 | Li et al. |
| 2020/0379794 A1* | 12/2020 | Kim ................... H04L 67/51 |
| 2020/0394120 A1 | 12/2020 | Salmi et al. |
| 2021/0042141 A1 | 2/2021 | De Marco et al. |
| 2021/0048995 A1 | 2/2021 | Myers et al. |
| 2021/0048998 A1 | 2/2021 | Myers et al. |
| 2021/0049002 A1 | 2/2021 | Myers et al. |
| 2021/0064262 A1 | 3/2021 | Myers et al. |
| 2021/0240734 A1 | 8/2021 | Shah et al. |
| 2022/0004381 A1 | 1/2022 | Myers et al. |
| 2022/0091830 A1* | 3/2022 | Ionescu ................ G06F 8/433 |
| 2022/0188170 A1 | 6/2022 | Smith |
| 2022/0201073 A1 | 6/2022 | Mallikarjuna Durga Lokanath et al. |
| 2022/0229649 A1 | 7/2022 | Myers et al. |
| 2022/0334725 A1* | 10/2022 | Mertes ................ G06F 16/275 |
| 2022/0350642 A1 | 11/2022 | Poddar et al. |
| 2023/0088202 A1 | 3/2023 | Myers et al. |

OTHER PUBLICATIONS developer.ibm.com [online], "Deploy a MongoDB replica set using the IBM Cloud Kubernetes Service," Mar. 15, 2018, retrieved on Oct. 25, 2019, retrieved from URL <https://developer.ibm.com/tutorials/cl-deploy-mongodb-replica-set-using-ibm-cloud-container-service/>, 14 pages.

developer.mozilla.org [online], "Package management basics," upon information and belief, available no later than Jul. 5, 2020, retrieved on Aug. 30, 2022, retrieved from URL <https://developer.mozilla.org/en-US/docs/Learn/Tools_and_testing/Understanding_client-side_tools/Package_management>, 9 pages.

(56) References Cited

OTHER PUBLICATIONS

Doc-archives.microstrategy.com [online], "Installing and Configuring MicroStrategy Library," Jun. 2017, retrieved on Oct. 25, 2019, retrieved from URL <https://doc-archives.microstrategy.com/producthelp/10.10/InstallConfig/WebHelp/Lang_1033/Content/install_config_library.htm>, 2 pages.
docs.docker.com [online], "Get Started, Part 1: Orientation and setup," 2017, retrieved on Oct. 25, 2019, retrieved from URL <https://docs.docker.com/get-started/>, 6 pages.
Dyn.com [online], "Kubernetes: The Difference Between Containers and Virtual Machines," Feb. 20, 2018, retrieved on Oct. 25, 2019, retrieved from URL <https://dyn.com/blog/kubernetes-the-difference-between-containers-and-virtual-machines/>, 8 pages.
edureka.co [online], "Docker Tutorial—Introduction to Docker & Containerization," 2017, retrieved on Oct. 25, 2019, retrieved from URL <https://www.edureka.co/blog/docker-tutorial>, IQpages.
ElectronicDesign.com [online], "What's the Difference Between Containers and Virtual Machines?" Jul. 15, 2016, retrieved on Nov. 12, 2019, retrieved from URL <http://electronicdesign.com/dev-tools/what-s-difference-between-containers-and-virtualmachines>, 3 pages.
kubernetes.io [online], "Concepts Underlying the Cloud Controller Manager," May 2019, retrieved on Jun. 20, 2019, retrieved from URL <https://kubernetes.io/docs/concepts/architecture/cloud-controller/>, 9 pages.
kubernetes.io [online], "StatefulSet," Jun. 2019, retrieved on Jun. 20, 2019, retrieved from URL <https://kubernetes.io/docs/concepts/workloads/controllers/statefulset/>, 9 pages.
Linkedin.com [online], "Moving MicroStrategy to a Docker/Kubernetes infrastructure," Jan. 2018, retrieved from Oct. 25, 2019, retrieved from URL <https://www.linkedin.com/pulse/moving-microstrategy-dockerkubernetes-infrastructure-montero/>, 3 pages.
Linuxize.com [online], "How To Remove Docker Containers, Images, Volumes, and Networks," Oct. 2018, retrieved on Oct. 25, 2019, retrieved from URL <https://linuxize.com/post/how-to-remove-docker-images-containers-volumes-and-networks/#remove-one-or-more-containers>, 11 pages.
Ma et al., "Efficient Service Handoff Across Edge Servers via Docker Container Migration," SEC '17: Proceedings of the Second ACM/IEEE Symposium on Edge Computing, Oct. 2017, 11:1-13.
Medium.com [online], "Understanding the Kubernetes Manifest," Dec. 1, 2019, retrieved on Aug. 30, 2022, retrieved from URL <https://medium.com/@sujithar37/understanding-the-kubernetes-manifest-97f44acc2cb9>, 7 pages.
MicroStrategy.com [online], "MicroStrategy Intelligence Server," Apr. 2019, retrieved on Oct. 25, 2019, retrieved from URL <https://www2.microstrategy.com/producthelp/10.4/ProjectDesignGuide/WebHelp/Lang_1033/Content/ProjectDesign/MicroStrategy_Intelligence_Server.htm>, 2 pages.
MicroStrategy.com [online], "Microstrategy on Kubernetes," 2019, retrieved on Oct. 25, 2019, retrieved from URL <https://www.microstrategy.com/getmedia/d99b44dc-ec44-451b-a5a3-3db7160282f0/Genesys-How-to-run-MicroStrategy-on-Kubernetes>, 10 pages.
Singh et al., "Container-based Microservice Architecture for Cloud Applications," 2017 International Conference on Computing, Communication and Automation (ICCCA 2017), May 2017, 847-852.
stackoverflow.com [online], "What's the difference between ClusterIP, NodePort and LoadBalancer service types in Kubernetes?" Jan. 2017, retrieved on Oct. 25, 2019, retrieved from URL <https://stackoverflow.com/questions/41509439/whats-the-difference-between-clusterip-nodeport-and-loadbalancer-service-types/52241241#52241241>, 6 pages.
Tao et al., "Dynamic Resource Allocation Algorithm for Container-based Service Computing," 2017 IEEE 13th International Symposium on Autonomous Decentralized Systems, Mar. 2017, 61-67.
v2.helm.sh [online], "Charts," upon information and belief, available No. later than May 13, 2020, retrieved on Aug. 30, 2022, retrieved from URL <https://v2.helm.sh/docs/developing_charts/>, 61 pages.
Wikipedia.org [online], "Docker (software)," Mar. 2013, retrieved on Oct. 25, 2019, retrieved from URL <https://en.wikipedia.org/wiki/Docker_(software)>, 8 pages.
Wikipedia.org [online], "Online analytical processing," Mar. 2018, retrieved on Mar. 19, 2020, retrieved from URL <https://en.wikipedia.org/wiki/Online_analytical_processing>, 14 pages.
Wikipedia.org [online], "OS-level virtualization," Aug. 2006, retrieved on Oct. 25, 2019, retrieved from URL <https://en.wikipedia.org/wiki/OS-level_virtualization>, 4 pages.
Wikipedia.org [online], "Package manager," upon information and belief, available no later than Apr. 1, 2002, retrieved on Aug. 30, 2022, retrieved from URL <https://en.wikipedia.org/wiki/Package_manager>, 10 pages.
Wikipedia.org [online], "System image," Feb. 2013, retrieved Oct. 25, 2019, retrieved from URL <https://en.wikipedia.org/wiki/System_image>, 2 pages.
Xu et al., "Mining Container Image Repositories for Software Configuration and Beyond," 2018 ACM/IEEE 40th International Conference on Software Engineering: New Ideas and Emerging Results (ICSE-NIER'18), May 2018, 49-52.

* cited by examiner

ENHANCED CLOUD-COMPUTING ENVIRONMENT DEPLOYMENT

TECHNICAL FIELD

The present specification relates to deploying computer environments in cloud computing platforms.

BACKGROUND

Many enterprises increasingly rely on cloud computing platforms to host server infrastructure. Using cloud computing systems provides many advantages, such as on-demand availability of computer system resources, scalability of data storage and computing power, without requiring direct active management by the user. Users of cloud computing platforms can benefit from the data centers that a cloud computing provider offers, without having to invest in and maintain the significant hardware infrastructure required. However, users still need to manage the software and data hosted on cloud computing platforms in order for these arrangements to be effective. For example, although a cloud computing platform may provide ample processing resources and data storage, the account owner still needs to manage and maintain the server environments and other functionality that resides in the cloud platform to provide effective service to clients devices.

SUMMARY

In some implementations, a computer system provides a set of software tools that facilitate the deployment and management of computing environments from within a customer's cloud computing account. For example, a software provider can provide a repository that includes software images, configuration data, automation scripts, and other items for a server environment. In addition, the software provider can provide a deployment package having the code or instructions configured such that, when invoked from within the customer's cloud computing account, the deployment package establishes software infrastructure within the account for deploying and managing new server environments. For example, the deployment package and related automation data can be configured to instantiate and run various software modules that can provide a deployment application programming interface (API), allocate a cluster of processing nodes, and respond to external commands to create new server environments. The deployment infrastructure and the environments can be container-based, e.g., run as containers using Docker, LXC, Windows Containers, or other systems. This technique provides the customer's cloud computing account not merely the provision of a new running environment, but the overall infrastructure to deploy and manage various different environments all from within the same account.

By providing the software to create infrastructure within a customer's own cloud computing account, the system also can also improve the efficiency and speed of environment deployment. For example, with deployment tools running within the customer's cloud computing account, the deployment tools can use configuration data, databases, backup files, and other data in the account, without requiring it to be transferred over a network to another system. When creating a new environment, the new deployment tools can directly access files in the cloud account, so that characteristics from the new environment can be derived from a backup, data previously transferred from an on-premises environment, another cloud computing environment in the account, and so on.

The present techniques also enhance the security of the deployment process. For many companies, governments, and other entities, maintaining security and integrity of their cloud computing accounts is critical. As a result, many entities have security policies that would prevent an outside software provider or contractor from obtaining permissions to access or configure their cloud computing accounts. Some policies restrict any ingress or egress data traffic to the account, which can block techniques that would attempt to push or drive deployment from external accounts or systems. Nevertheless, the present technique can enable deployment while satisfying these policies, by providing the infrastructure that enables customers to pull in the appropriate software and related items and direct deployment locally.

For example, the software provider can provide a deployment package with code or scripts tailored for the destination cloud computing platform. The customer can retrieve the deployment package and place it in their account. The customer invokes the code in deployment package within the cloud computing account, which pulls in over the communication network all of the container images, configuration data, and supporting deployment artifacts that are needed to establish both (1) the deployment management infrastructure (e.g., API layer, management modules, processing node cluster, reporting and alerting functions, and so on), and (2) one or more server environments (e.g., having containers for web server functionality, document library functionality, application server functionality, database server functionality, and so on). In some implementations, once the initial deployment package has retrieved the containers, configuration data, and related items, the cloud computing account does not depend on or need to interact with the software provider's system. The deployment package can initiate creation, in the customer's own cloud computing account, of the deployment infrastructure, APIs, and other functionality needed for the customer to create multiple environments on-demand, directed and managed within the customer's own cloud-computing account.

In one general aspect, a method performed by one or more computers includes: providing, by the one or more computers, a repository comprising (i) deployment tools configured to provide a deployment application programming interface (API) for deploying server environments within a cloud computing account, (ii) a set of container files configured to operate together to provide a server environment when the container files are run as containers, and (iii) configuration data for the container images; and providing, by the one or more computers, a deployment workflow package to a computing system associated with a customer, wherein the deployment workflow package, when invoked for a cloud computing account of the customer, is configured to: retrieve the set of container files from the repository over a communication network and store the retrieved set of container files in the cloud computing account of the customer; retrieve the configuration data from the repository over a communication network and store the retrieved configuration data in the cloud computing account of the customer; retrieve the deployment tools from the repository over a communication network and store the retrieved deployment tools in the cloud computing account of the customer; and run the deployment tools, hosted in the cloud computing account of the customer, the deployment tools comprising (i) an API gateway for the deployment API and (ii) a deployment orchestrator module configured to create and manage a cluster of processing nodes according to instructions received through the deployment API.

In some implementations, the method includes: identifying a customer account for the customer; and changing permissions for the repository to permit the customer account to access contents of the repository.

In some implementations, the repository comprises multiple sets of deployment tools or configuration data corresponding to different cloud computing platforms.

In some implementations, the deployment tools, when hosted in the cloud computing account of the customer, are configured to create and deploy server environments in the cloud computing account of the customer without granting permissions to access the cloud computing account of the customer.

In some implementations, the configuration data comprises data indicating software dependencies and configuration settings for installing or running containers based on the container images in the repository.

In some implementations, the deployment tools include one or more automation scripts, and the deployment workflow package is configured to invoke the one or more automation scripts to create the deployment tools, create a cluster of processing nodes, or deploy a server environment in a cluster of processing nodes.

In some implementations, the deployment orchestrator module is configured to create a cluster of processing nodes responsive to a cluster creation command through the deployment API, wherein the cluster creation command triggers a cluster creation workflow that automatically generates, in the cluster, an environment configuration module.

In some implementations, the environment configuration module is configured to respond to an environment creation command provided through the deployment API after creation of a cluster of processing nodes, and wherein the environment configuration module is configured to respond to the environment creation command by: creating a namespace for a new environment, identifying a set of containers needed for the new environment, and running, in the created namespace, instances of the identified set of containers based on the retrieved container images stored in the cloud computing account, wherein parameters for the containers are set according to the retrieved configuration data stored in the cloud computing account.

Other embodiments of these aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
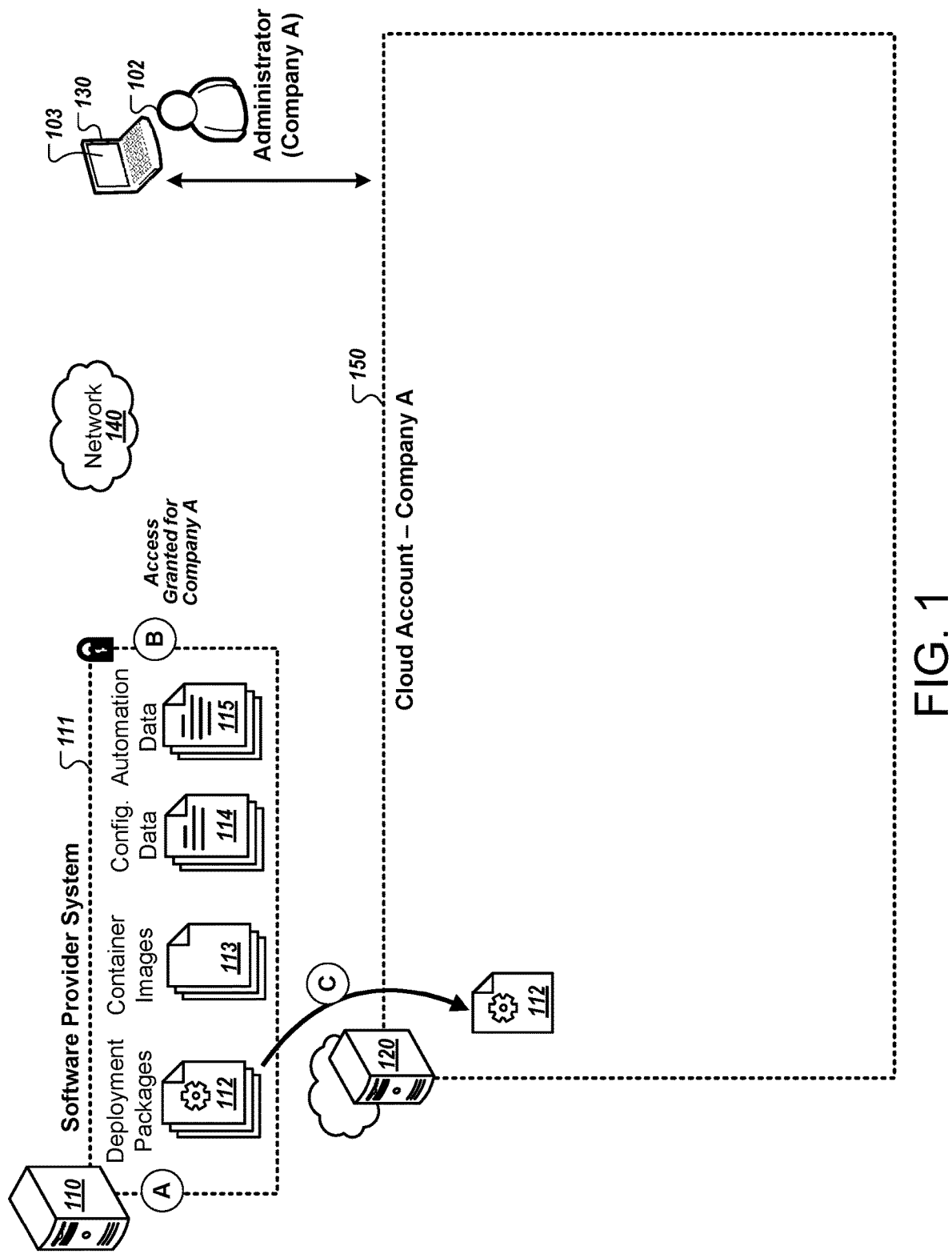
FIGS. 1-4 are diagrams showing an example of a system for facilitating deployment of computing environments in cloud computing systems.

FIGS. 1-4 are diagrams showing an example of a system 100 for facilitating deployment of computing environments in cloud computing systems. The system 100 includes a computer system 110 of a software provider, a cloud computing platform 120, and a computing device 130 of an administrator 102 from a customer of the software provider. The computer system 110, the cloud computing platform 120, and the computing device 130 all communicate over a communication network 140, such as the Internet. In the example, the software provider, the operator of the cloud computing platform 120, and the customer (e.g., Company A) are all third parties with respect to each other. FIGS. 1-4 show a series of steps or stages labelled (A) to (M), which illustrate various operations and the flow of data in the system 100.

The example discussed in FIGS. 1-4 uses examples that make use of various tools and frameworks such as Docker, Kubernetes, Helm, and others. These are simply examples of some of the many container formats and container management tools that can be used. For example, instead of using Docker containers, other types or formats of containers can be created, e.g., for LXC, Windows Containers, rkt, runC, and others. Rather than using Kubernetes, other container orchestration tools and container-as-a-service (CaaS) providers, can be used, such as Amazon Web Services (AWS) Fargate, Microsoft Azure Container Instances, Google Cloud Run, Amazon Elastic Kubernetes Service (EKS), Openshift Container Platform, Rancher, and so on. Similarly, instead of using Helm, other package mangers can be used, including Rancher, Ansible, Spring Cloud, Terraform, Kustomize, and others.

Figure 2:
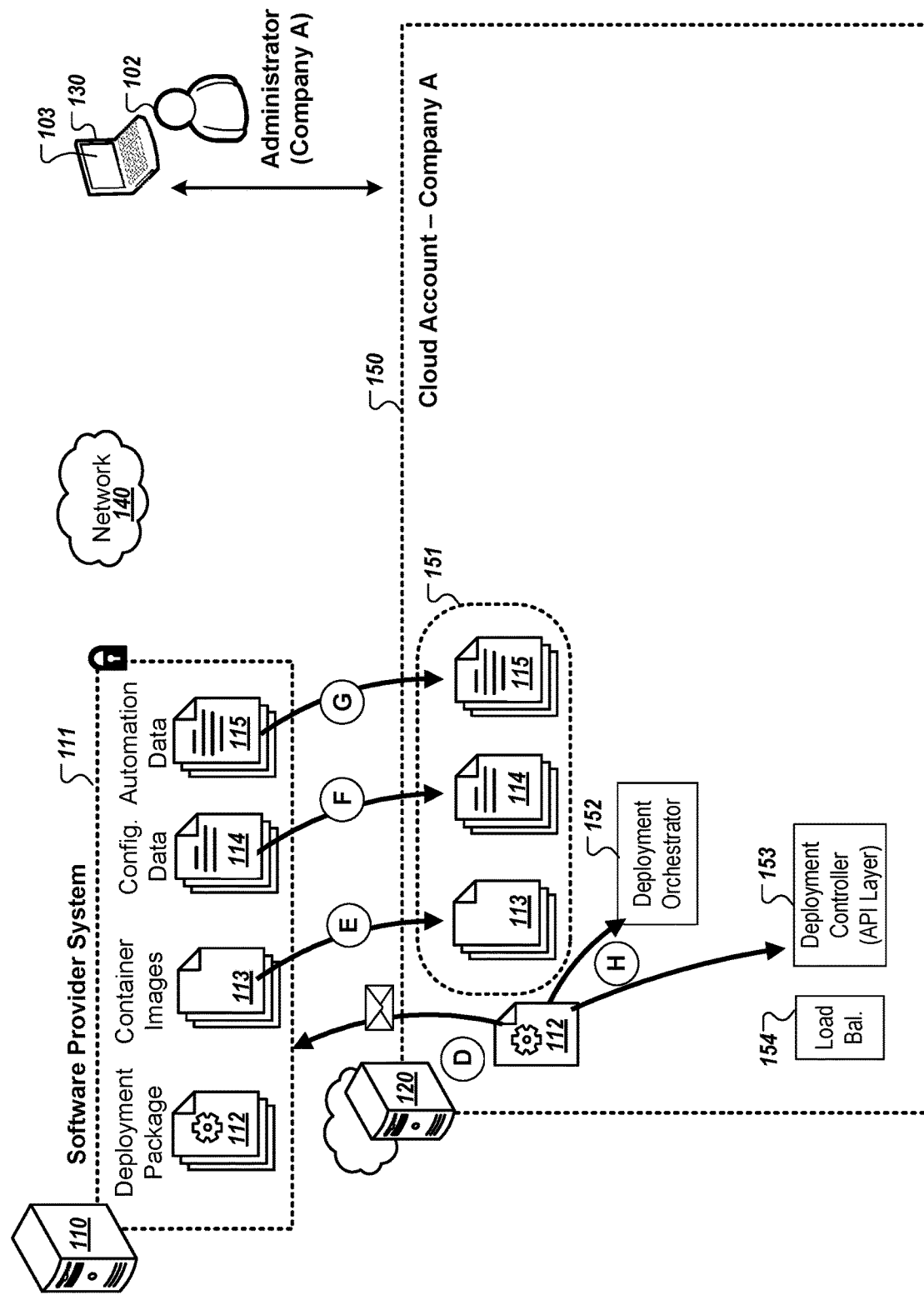
Figure 3:
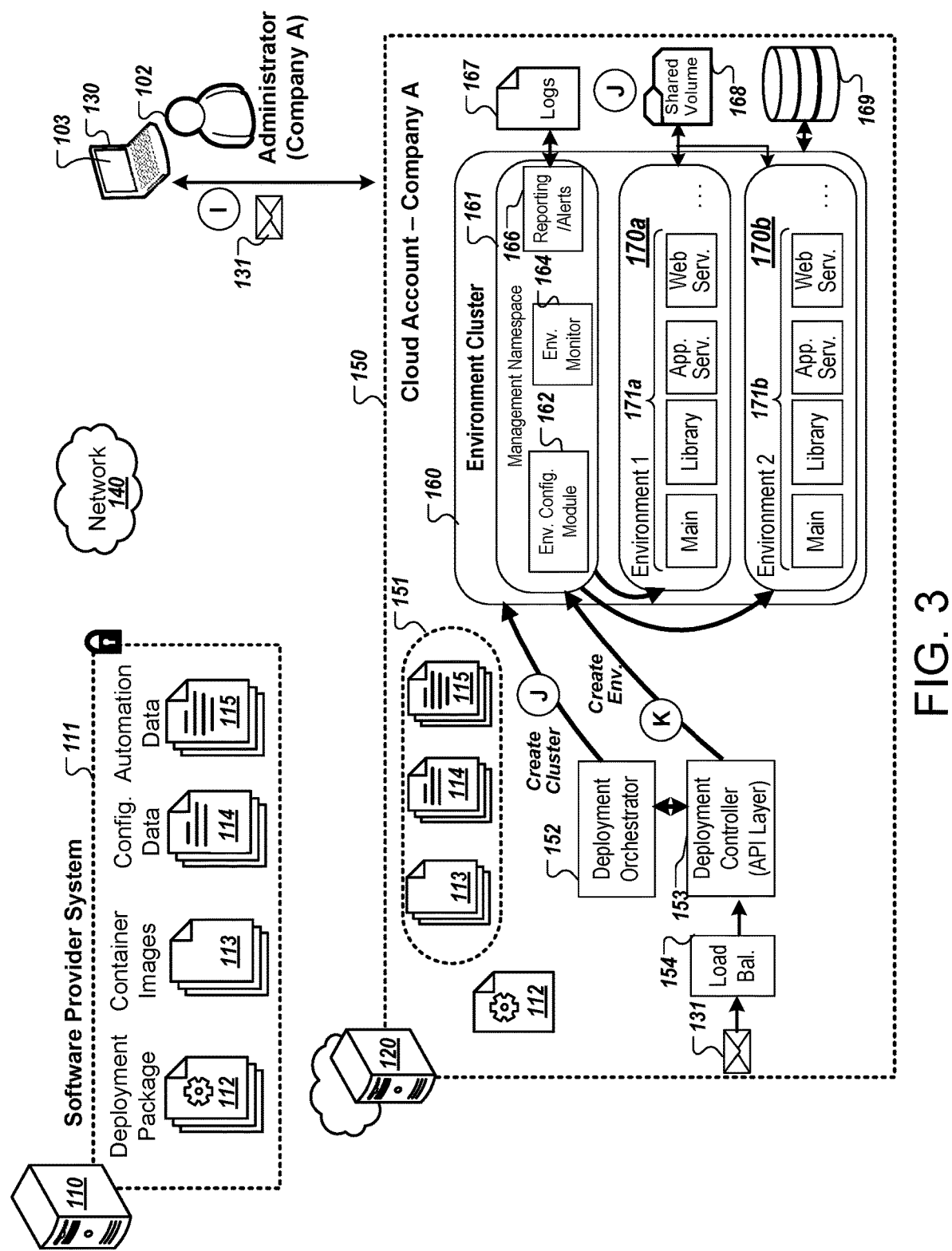
Figure 4:
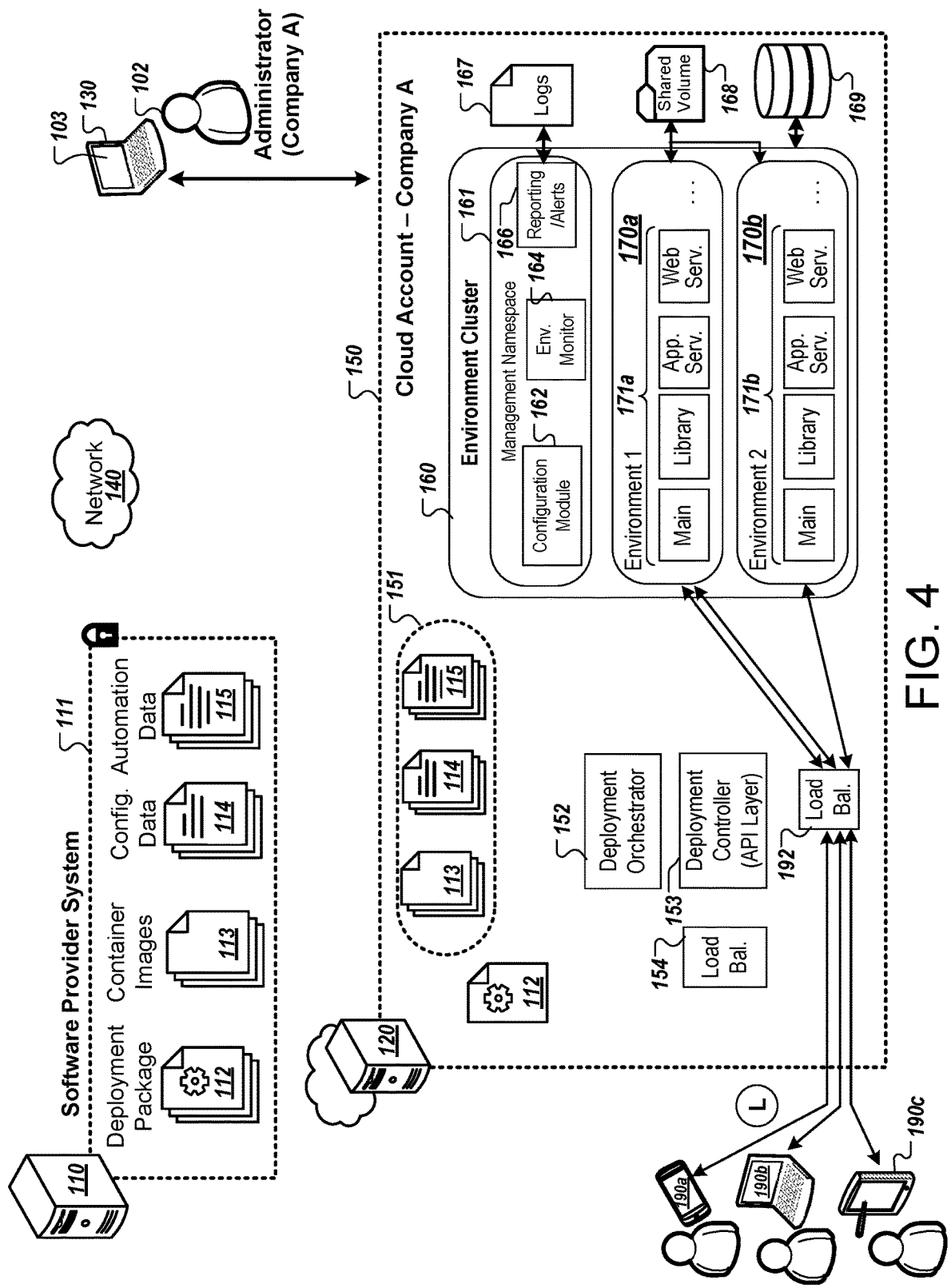

Each of FIGS. 1-4 shows a different stage or phase in an example process of deploying computing environments into an account of the cloud computing platform 120. As an overview, FIG. 1 shows an initial stage in which the software provider makes software and deployment code available in a repository 111. The customer retrieves, and stores in the cloud computing account 150, a deployment package 112 that can be invoked to initiate the deployment process. FIG. 2 shows operations performed when the initial code or script in the deployment package 112 is invoked. For example, invoking the deployment package 112 can trigger the retrieval of various elements from the repository 111 into the cloud account 150, as well as creating and running software modules to manage and create server environments. FIG. 3 shows additional deployment operations that can be performed, triggered by the deployment package 112 and/or responsive to instructions of the administrator 102 for the cloud account 150. These operations can create a cluster 160 of processing nodes in the account 150, as well as create one or more environments 170a-170b running in the cluster 160. Using the deployment tools and API already established in the account 150, as well as the container images and configuration data retrieved earlier, the administrator 102 can create, run, and manage server environments, with desired combinations of containers, in the account 150 without any communication with the software provider's system 110. FIG. 4 shows the deployed environments 170a-170b in use, providing service to various client devices 190a-190c over the network 140.

In further detail, referring to FIG. 1, stage (A) shows the software provider's computer system 110 hosting a repository 111 of objects that can be used to create deployment infrastructure as well as deploy server environments. The repository 111 can be publicly accessible so that customers can access contents over the network 140, but the repository can also be access-controlled to limit access to authorized parties or accounts and to limit which contents are available to different parties.

As an initial set-up step, the software provider builds, releases, tests, and deploys container images 113 and related configuration data 114 into a registry, before finally making the items available in the repository. When a software developer completes code and merges it into the code repository, the computer system 110 can trigger an automated job (e.g., including a "docker build" command) to build a container image 113 based on an underlying Docker file. The computer system 110 can run various tests on the generated container images 113 as well. Unit tests and other automated tests can be triggered to ensure that each container image 113 can be started and run without errors, and that the desired functionality (e.g., services, APIs, etc.) of the container is provided with expected performance characteristics. Once the tests validate that the container operates properly, it is entered into an internal (e.g., private) container registry.

Along with the container images 113, the computer system 110 can generate configuration data 114. The configuration data 114 can include package information for installing and configuring one or more container images 113, such as information in a Helm chart. The packaging information can include a collection of files that can be arranged in a folder, directory tree, or other form of archive. The configuration data can include configuration data in YAML or JSON files, lists of software and data dependencies, default configuration values, templates for generating manifest files, version control information (e.g., specifying which versions of software or containers are supported, or which versions of supporting software are required), scope and namespace information, and any other information needed for installing or configuring an instance of a container or of a collection of containers. The package information provides the metadata and settings to ensure compatibility and proper configuration, so that Helm or another similar package manager can automatically install and run containers from the container images 113. The configuration data 114, like the container images 114, are run through various automated tests to ensure that they function properly and can install the corresponding containers and run without errors. The configuration data 114 is entered into an internal (e.g., private) registry.

The computer system 110 can also run a test deployment of the container images 113 using the configuration data 114. For example, the system 110 can deploy the container images 113 as containers in cluster of processing nodes (e.g., a Kubernetes cluster) in a target cloud computing platform. The testing can be performed for multiple different cloud computing platforms, to validate the function of the container images 113 and configuration data 114 for multiple different cloud computing platforms (e.g., Amazon Web Services (AWS), Microsoft Azure, Google Cloud, etc.). Once installed and run, various automated tests certify proper function of the software, including security scanning to test for security vulnerabilities in the containers. Once the release is certified, the certified versions of the container images 113 and configuration data 114 are added to the repository 111, which is accessible over the network 140 by customers.

The repository 111 also stores other types of data used in the deployment process. This includes deployment packages 112, which are configured to be invoked from within a customer's cloud computing account 150 to start the automated process of building the deployment architecture in the account 150. Different deployment packages 112 can be provided for different cloud computing providers, to account for differences in APIs, command syntax, communication protocols, programming tools (e.g., compilers, etc.), and other features. Each deployment package 112 represents the initial set of code, scripts, or other content that can be invoked from within a cloud computing account 150 to start building the deployment architecture. As a result, the deployment package 112 can reference container images 113 for the deployment management modules, corresponding configuration data 114, as well as other data that specifies the sequences of operations needed. In addition to the deployment packages 112, the repository 111 also stores other automation data 115, which can include scripts for various tasks used in the process of establishing the deployment management functionality in the account 150 and/or for deploying server environments. Different sets of automation data 115 can be provided for each of various different cloud computing platforms. The deployment packages 112 and automation data 115 can also be tested before being made available for use by customers.

The deployment package 112 can specify, or can link to or otherwise reference, the sets of different files (e.g., container images 113, configuration data 114 files, automation data 115 files, etc.) that are needed, both for enabling the deployment infrastructure as well as the server environments for serving client devices. As will be discussed with respect to FIG. 2, invoking the deployment package 112 can cause the cloud computing account 150 to automatically retrieve the container images 113, configuration data 114, and automation data 115 over the network 140 and store them in the cloud computing account 150.

In stage (B), the computer system 110 grants permission for the customer (e.g., Company A in the example) to access the deployment information in the repository 111. For example, after the customer agrees to a service agreement, terms of use, or other agreements, the computer system 110 can grant authorization for an account of the customer to be able to browse and download appropriate items needed to access the deployment tools and server environment information for appropriate versions of the software provided by the provider. The computer system 110 may provide access in various other ways. For example, the computer system 110 may generate and provide a universal resource identifier (URI), universal resource locator (URL), or other reference to the deployment package 112, in addition to updating permissions so a request for the package 112 and other data will be granted by the system 110. In some implementations, the software provider has provided a user interface 103 in a client-side application that can run on the computing device 130, or in a web page or web application that runs in a browser, which also can be updated to show or grant permission to access the contents of the repository 111.

In stage (C), the administrator 102 obtains a deployment package 112 from the repository 111 that is appropriate for the cloud computing platform 120. The administrator saves the deployment package 112 into the cloud computing account 150. In some implementations, the deployment package 112 is downloaded directly from the repository into the cloud computing account 150. In other implementations, the deployment package 112 can be provided through one or more intermediary devices, such as saved to the client computing device 130 and then uploaded into the cloud computing account 150.

In some implementations, a user interface 103 of an application or web page provides interactive controls to select, download, and store the deployment package 112 into the cloud computing account 150. For example, the software provider system 110 can provide a link or landing page created for the customer, which can include a unique URL for the customer to download the deployment package 112. The deployment package 112 can be one that is generated for, or selected from among many options, that is applicable for the customer and the cloud computing account 150. For example, multiple different deployment packages 112 can be stored, each for different software products, for different versions of a software product (e.g., different build versions of the software), for different combinations of features, and so on. As a result, the different deployment packages 112 may cause different sets of containers, or different versions of the containers, to be downloaded and used. Similarly, different deployment packages 112 can be stored and configured for different cloud computing platforms, to maximize compatibility and efficiency in running with the different APIs and infrastructure of each cloud computing platform. The computer system 110 can store information about each customer, indicating the software product and version that the customer has requested or paid for, as well as the target cloud computing platform (e.g., Amazon AWS, Microsoft Azure, Google Cloud, etc.) the customer intends to deploy to. With this information, the computer system 110 can provide a deployment package 112 that is appropriate for or is customized for the particular product, product version, and target cloud computing platform. In some implementations, the computer system 110 can provide user interface data with links or options for multiple different deployment scenarios (e.g., different combinations of product, product version, and target platform) so that the administrator 102 can select the option that best fits the current situation.

In some implementations, the computer system 110 hosts the repository 111 as a publicly accessible registry, although access control may still be applied to various folders or files. In some implementations, the repository 111 is stored in cloud computing platform, such as a file system or data storage service provided by the cloud computing platform 120. In this situation, to provide the deployment package 112 to the customer, the computer system 110 can generate or select the deployment package 112 for the customer, modify the condition of the cloud-computing storage to enable the customer to access the deployment package 112, and then generate and provide a URL to the customer (e.g., through e-mail, a web page, a web application interface, an interface of a native application on the device 130, etc.) for the deployment package 112 as stored in the cloud-computing storage. As a result, when the administrator uses the URL to retrieve the deployment package 112, it can be done simply as a transfer, within the cloud computing platform 120, from the software provider's account or data storage into the account 150 of the customer.

Referring to FIG. 2, stages (D) through (H) show steps to enable various deployment tools and deployment data into the cloud computing account 150. In stage (D), the administrator 102 invokes the deployment package 112 that is stored within the cloud computing account 150. The deployment package 112 can includes code that can be executed or interpreted to start various processes that create deployment tools in the account 150. For example, the deployment package can include a script that can be run to execute various tasks. This can include compiling code, building software objects, and installing generated applications or modules. For example, for the AWS platform, a script can be generated using the AWS CodeBuild tool to compile and build code to integrate deployment tools into the account 150.

One of the actions triggered by invocation of the deployment package 112 is to communicate with the computing system 110 over the network 140 to retrieve the additional software and data needed to create deployment tools and deploy server environments. Because the account 150 is used to pull in the needed objects, the process fulfills security policies that may prevent granting permissions to the account or accepting transfers initiated by third parties. In this case, the deployment package 112 requests the container images 113, configuration data 114, and automation data 115 needed for deployment in the cloud computing platform 120.

In stage (E), the cloud computing account 150 receives the container images 113, which can be for both deployment management tools and for server environments to be deployed. In stage (F), the cloud computing account 150 receives the configuration data 114 (e.g., Helm charts or other packaging data). In stage (G), the cloud computing account 150 receives the automation data 115, including scripts for creating various aspects of the deployment tools. The downloaded data can be stored in a local repository 151 within or associated with the cloud computing account 150. In some implementations, a repository 151 can be maintained by the customer to service multiple cloud computing accounts. At this point in the process, the cloud computing account 150 contains all of the software and configuration data needed to create the environment deployment infrastructure (e.g., tools for managing and deploying environments) as well as the software to be run in the server environments being deployed. No further communication with the computing system 110 is needed for setup and deployment, although upgraded versions of the containers and the deployment infrastructure can be made available and downloaded from time to time to update those in the account 150.

In step (H), the deployment package 112 can initiate a sequence of operations to create and run various software modules, such as a deployment orchestrator 152, a deployment controller 153, and a load balancer 154. These modules can be instantiated from container images 113 and their associated configuration data 114 (e.g., package information). The modules to create and the operations to perform can be based on tasks specified in the deployment package 112 or through scripts in the automation data 115 that are invoked by the deployment package 112. For example, executing a script in the deployment package 112 may (i) download the automation data 115 for the cloud computing platform 120, and (ii) execute additional scripts in the automation data 115 to install, configure, and run containers and other software to provide deployment tools.

As illustrated in further steps below, providing the deployment orchestrator 152 can be much more advantageous than simply providing an instance of an environment for the customer to use. For example, the customer's cloud computing account 150 does not merely gain a single instance of an environment, but obtains the deployment infrastructure to create and manage clusters, along with management elements within each cluster to be able to create and manage various environments. The deployment orchestrator 153, receiving commands and instructions via the API provided by the deployment controller 153 can create multiple clusters, create multiple environments within each cluster, as well as instantiate the functionality for environment monitoring and reporting within each cluster.

In the example, the deployment orchestrator 152 is a module that manages clusters of processing nodes, such as a Kubernetes cluster on which server environments can run. For example, the deployment orchestrator 152 can enable functions such as cluster creation and management, cluster upgrade, configuration and setup for the deployment tools (e.g., for the deployment orchestrator 152 and the deployment controller 153), and so on.

The deployment controller 153 can provide an API, such as a representational state transfer (REST) API, for deploying and managing environments within a cluster, and for managing the cluster. The deployment controller 153 act as an API gateway, and can include a software stack to communicate with the deployment orchestrator 152 and/or a cluster of processing nodes to support various API commands. For example, the deployment controller 153 supports a variety of environment management functions, including creating an environment, managing or configuring an environment, deploying or making an environment accessible to clients, starting and stopping an environment, scaling an environment up or down (e.g., adding or removing allocations of computing resources such as CPUs, memory, storage, etc.), scaling an environment out and in (e.g., increasing or decreasing replica count), upgrading the software of an environment, initiating backup or restore of environment data, and deleting an environment. The API can also support actions to manage a cluster in cooperation with the deployment orchestrator, such as commands to create a cluster (e.g., with a specified region, instance type, cluster size, and other parameters), or to modify a cluster (e.g., to add or remove processing nodes, to change the instance type, to change auto-scaling settings for adjusting allocation of computing resources, etc.)

The load balancer 154 can route and manage requests through the API, providing a module that insulates the deployment controller 153 from direct outside requests and also helping to balance load when multiple deployment controller 153 instances or multiple clusters are used.

At the end of the operations shown in FIG. 2, the cloud computing account 150 is running the deployment infrastructure needed to create and deploy server environments, and also stores, in the repository 151, all of the software and configuration data for those server environments.

In some implementations, the deployment controller 153 can act as an API server to serve API requests specific to clusters and environments within these clusters. The deployment controller 153 can provide an entry point for instructions and requests to create and manage environments. The implementation of the deployment controller 153 can be cloud-agnostic or cloud-specific. In either scenario, the deployment controller 153 can perform functions such as serving API endpoints, triggering cluster or infrastructure creation, providing wait logic for cluster or infrastructure creation, storing cluster or infrastructure information, storing environment information within a cluster or infrastructure, supporting operations (e.g., create, read, update, delete) on cluster or infrastructure, providing authentication and authorization functionality, and supporting future updates or changes to the deployment infrastructure itself (e.g., to the deployment orchestrator 152 and deployment controller 153 itself).

A cloud-agnostic approach (e.g., an application that can be a deployment controller 153 for any of multiple cloud computing platforms) can involve creating an application to serve as the deployment controller 153. The application can be hosted on an instance. Since there can be many requests coming to the application, and because allowing direct access to the instance could be a security risk, the architecture can place a load balancer in front of the application. This way, the application for the deployment controller 153 will be able to serve API endpoints and trigger cluster creation. Cluster creation is a cloud-specific process, in the sense that the operations and settings vary from one cloud computing platform to another. As a result, the application can include packages, libraries, scripts, or modules for different cloud computing platforms. Since cluster creation takes time, the application can include multiple threads and/or functionality to perform asynchronous operations, e.g., wait logic for cluster and infrastructure creation. In case the application crashes and needs to start again from its previous state, the application can be configured to store and retrieve information from a database. In general, cluster-specific and environment-specific information also needs to be stored, and can be stored in the same database. The application can be configured to perform operations on the cluster and/or specific environment (e.g., create, read, update, delete, etc.). The application also can be protected against unauthenticated and unauthorized access. The application can be maintained as future updates and enhancements are deployed, so the application can include an update or upgrade mechanism.

Even with an cloud-agnostic approach, with the same application used for multiple different cloud computing platforms, some operations will be specific to the cloud computing platform used. The application would be hosted on a virtual machine, container, computing instance, or other computing elements of the desired platform, and a load balancer and database cluster for management data would be created. The application will be able to identify which cloud computing platform it is hosted on through appropriate interaction with APIs of the cloud computing platform. The application also includes logic to execute the cluster management process specific to the cluster characteristics of the cloud computing provider identified. This approach gives a unified application that can be used on any cloud service but still manages the specific details required for hosting and managing clusters and environments on each specific cloud computing platform.

As another example, a cloud-specific approach can customize or target the deployment controller 153 for a specific cloud computing platform. For example, the individual pieces of the deployment controller 153 can be generated or tailored for a specific target cloud computing platform. For example, for Amazon AWS, the deployment controller 153 can be implemented using Amazon API Gateway APIs to serve API endpoints and trigger cluster creation. Various functionality of the deployment controller 153 can also be created using CloudFormation templates. The deployment controller 153 can handle cluster creation with workflows and procedures (e.g., potentially defined using AWS Step Functions), which can be directly called from an ApiGateway API using the integration request. As another example, to provide wait logic for cluster or infrastructure creation, the application can use a workflow to issue an event or trigger a function (e.g., optionally using AWS Lambda platform) as needed. In case the application crashes and needs to start again from the earlier state, and also to store some cluster or environment-specific information an Amazon DynamoDB can be used. The database can be created using a CloudFormation template. The operations on the cluster and/or environments can be performed using a Lambda function which can access the DynamoDB for read operations and can call specific clusters for other operations if required. In order to protect against unauthenticated and unauthorized access, new API keys can be created, and the API Gateway can be configured to allow access via those specific API keys. For future updates and enhancements to be deployed, the system can provide an updated CloudFormation template to the customer and they can update the Stack as they see fit. This example shows how some of the Amazon AWS tools can be integrated into the function of the deployment controller 153. Leveraging the tools natively provided by a specific cloud computing platform avoids the need for cloud-specific code and provides the deployment controller 153 as a lean application (e.g., limiting the resource usage, dependencies, and other overhead). The system can be customized with cloud-platform-specific elements for each of various other cloud computing platforms. For example, the deployment controller 153—as well as other components such as the deployment package 112, the deployment orchestrator 152, automation data 115, configuration data 114, etc.—can be customized to use the APIs, tools, protocols, and other features that a specific cloud computing platform provides.

FIG. 3 shows actions in the system 100 to create a cluster 160 of processing nodes and to deploy server environments 170a-170b in the cluster 160.

In stage (I), the administrator 102 uses the computing device 130 to interact with the deployment tools in the cloud computing account 150. The administrator 102 sends instructions 131 that leverage the API provided by the deployment controller 153.

These instructions 131 can be sent using direct commands, through scripts or command-line interface, or can be sent as a result of interaction with a graphical user interface. For example, the software provider can provide a native application, web application, or web page that includes functionality to generate and issue commands for the API, to create and manage clusters as well as server environments. In the illustrated example, the instructions 131 include API commands to create a new cluster of processing nodes and to create two environments in the cluster.

In stage (J), instructions 131 to create a new cluster are received, interpreted, and communicated to the deployment orchestrator 152, which creates a new cluster 160 of processing nodes, e.g., a Kubernetes cluster. The instructions 131 can include, as API call payload data, various settings or parameter values such as geographical region settings, an instance type, cluster size, and so on, and the deployment orchestrator 152 creates the cluster 160 according to the specified parameters. In some implementations, the instructions 131 trigger a cluster deployment workflow for that includes several steps, including (1) deploying a cluster 160 of processing nodes, including allocating appropriate computing resources to the cluster 160 and providing status updates for the cluster 160, (2) creating a management namespace 161 and deploying an environment configuration module 162 in the cluster 160, along with an environment monitor 164 and reporting and alerting functionality 166, (3) provisioning a file system 168 that can optionally act as a shared volume for multiple environments, and (4) provisioning relational database services 169, e.g., a database engine configured to process structured query language (SQL) statements and connect to existing databases. The cluster creation workflow can also involve deploying the cluster 160 in a private subnet, along with worker nodes and resource auto-scaling groups. Once the cluster 160 is created, the customer can trigger the creation of environments In stage (K), after the cluster 160 is running and available, additional instructions 131 to create server environments in the cluster 160 are received. The instructions 131 can use API calls for the deployment controller API and instruct to deploy a particular server environment in a specific cluster 160 and for specific geographic region settings. The API call can specify which services are desired for the new environment. These services can correspond to different containers from different container images 113, for example, a document library, web server, application server, telemetry module, platform analytics, and so on. The deployment controller 153 provides the instructions and related parameter values to the environment configuration module 162, which acts as an environment orchestrator to create a namespace for each new environment, and to install the appropriate packages and containers needed.

For example, after creating an environment namespace for a new environment 170a, the environment configuration module 162 can access the configuration data 114 for the environment configuration selected (e.g., the combination of containers needed to provide the services specified through the deployment controller API). The environment configuration module 162 identifies the container images 113 needed to provide the containers of the environment 170a, and the configuration data 114 can include package information as discussed above (e.g., indicating dependencies, default settings, and so on). In some implementations, the dependencies and parameters are specified in a Helm chart or manifest file that specifies the elements and actions needed to deploy the respective containers needed for the environment 170a. In the example, the environment 170a is deployed with a set of containers 171a run from corresponding container images 113. The environment 170b is deployed with a set of containers 171b.

The environment deployment process can include deploying an environment pod, which is a single instance of a running environment. The environment pod can include one or more containers. In some implementations, when multiple containers are included the containers are managed as a single entity and they share the resources of the pod.

In some implementations, one or more environments 170a, 170b may be generated based on configuration data from another server environment. For example, settings may be replicated or derived from an archive of environment data for another cloud computing environment or from an on-premises environment. In this process, the environment configuration module 162 may derive configuration settings from the source environment or an archive (e.g., backup data for an environment), and then configure the new environment with those configuration settings. In this process, the deployment of the new environment does not provide or disclose the environment data or settings to any external party. If the source environment data is already in the account 150, then no transfer of the environment data is required either.

During environment deployment and afterward, the environment monitor 164 checks the state of each environment 170a-170b and can provide this information to other deployment elements in the account 150 and/or to the computing device 130. The reporting and alerting module 166 enables the administrator 102 to specify various conditions or triggers for generating log data for logs 167 or providing alerts, which can be provided through any of various channels, e.g., e-mails, mobile device text messages, online messaging platforms, messages through an management user interface 103, and so on.

FIG. 4 shows users accessing the deployed environments 170a, 170b over the network 140 using various client devices 190a-190c. In stage (L), the client devices 190a-190c send requests that are routed to and handled by the environments 170a, 170b. For example, the interactions may be to serve web pages, provide application content, serve documents, generate reports and visualizations, generate information for dashboards and other interfaces, run queries, and so on.

Traffic from the client devices 190a-190c can be run through a load balancer 192 that is used to direct requests to the appropriate environments 170a, 170b corresponding to the requests, and to manage traffic flow to manage load to appropriate levels.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

The invention claimed is:

1. A method performed by one or more computers, the method comprising:
    providing, by the one or more computers, a repository comprising (i) deployment tools configured to provide a deployment application programming interface (API) for deploying server environments within a cloud computing account, (ii) a set of container files configured to operate together to provide a server environment when the container files are run as containers, and (iii) configuration data for the container files; and
    providing, by the one or more computers, a deployment workflow package to a computing system associated with a customer, wherein the deployment workflow package, when invoked for a cloud computing account of the customer, is configured to:
        retrieve the set of container files from the repository over a communication network and store the retrieved set of container files in the cloud computing account of the customer;
        retrieve the configuration data from the repository over a communication network and store the retrieved configuration data in the cloud computing account of the customer;
        retrieve the deployment tools from the repository over a communication network and store the retrieved deployment tools in the cloud computing account of the customer; and
        run the deployment tools, hosted in the cloud computing account of the customer, the deployment tools comprising (i) an API gateway for the deployment API and (ii) a deployment orchestrator module configured to create and manage a cluster of processing nodes according to instructions received through the deployment API.

2. The method of claim 1, further comprising:
    identifying a customer account for the customer; and
    changing permissions for the repository to permit the customer account to access contents of the repository.

3. The method of claim 1, wherein the repository comprises multiple sets of deployment tools or configuration data corresponding to different cloud computing platforms.

4. The method of claim 1, wherein the deployment tools, when hosted in the cloud computing account of the customer, are configured to create and deploy server environments in the cloud computing account of the customer without granting permissions to access the cloud computing account of the customer.

5. The method of claim 1, wherein the configuration data comprises data indicating software dependencies and configuration settings for installing or running containers based on the container files in the repository.

6. The method of claim 1, wherein the deployment tools include one or more automation scripts, and the deployment workflow package is configured to invoke the one or more automation scripts to create the deployment tools, create a cluster of processing nodes, or deploy a server environment in a cluster of processing nodes.

7. The method of claim 1, wherein the deployment orchestrator module is configured to create a cluster of processing nodes responsive to a cluster creation command through the deployment API, wherein the cluster creation command triggers a cluster creation workflow that automatically generates, in the cluster, an environment configuration module.

8. The method of claim 7, wherein the environment configuration module is configured to respond to an environment creation command provided through the deployment API after creation of a cluster of processing nodes, and wherein the environment configuration module is configured to respond to the environment creation command by:
    creating a namespace for a new environment,
    identifying a set of containers needed for the new environment, and
    running, in the created namespace, instances of the identified set of containers based on the retrieved container files stored in the cloud computing account, wherein parameters for the containers are set according to the retrieved configuration data stored in the cloud computing account.

9. A system comprising:
    one or more computers; and
    one or more computer-readable media storing instructions that, when executed by the one or more computers, cause the system to perform operations comprising:
    providing, by the one or more computers, a repository comprising (i) deployment tools configured to provide a deployment application programming interface (API) for deploying server environments within a cloud computing account, (ii) a set of container files configured to operate together to provide a server environment when the container files are run as containers, and (iii) configuration data for the container files; and providing, by the one or more computers, a deployment workflow package to a computing system associated with a customer, wherein the deployment workflow package, when invoked for a cloud computing account of the customer, is configured to:
retrieve the set of container files from the repository over a communication network and store the retrieved set of container files in the cloud computing account of the customer;
retrieve the configuration data from the repository over a communication network and store the retrieved configuration data in the cloud computing account of the customer;
retrieve the deployment tools from the repository over a communication network and store the retrieved deployment tools in the cloud computing account of the customer; and
run the deployment tools, hosted in the cloud computing account of the customer, the deployment tools comprising (i) an API gateway for the deployment API and (ii) a deployment orchestrator module configured to create and manage a cluster of processing nodes according to instructions received through the deployment API.

10. The system of claim 9, wherein the operations further comprise:
identifying a customer account for the customer; and
changing permissions for the repository to permit the customer account to access contents of the repository.

11. The system of claim 9, wherein the repository comprises multiple sets of deployment tools or configuration data corresponding to different cloud computing platforms.

12. The system of claim 9, wherein the deployment tools, when hosted in the cloud computing account of the customer, are configured to create and deploy server environments in the cloud computing account of the customer without granting permissions to access the cloud computing account of the customer.

13. The system of claim 9, wherein the configuration data comprises data indicating software dependencies and configuration settings for installing or running containers based on the container files in the repository.

14. The system of claim 9, wherein the deployment tools include one or more automation scripts, and the deployment workflow package is configured to invoke the one or more automation scripts to create the deployment tools, create a cluster of processing nodes, or deploy a server environment in a cluster of processing nodes.

15. The system of claim 9, wherein the deployment orchestrator module is configured to create a cluster of processing nodes responsive to a cluster creation command through the deployment API, wherein the cluster creation command triggers a cluster creation workflow that automatically generates, in the cluster, an environment configuration module.

16. The system of claim 15, wherein the environment configuration module is configured to respond to an environment creation command provided through the deployment API after creation of a cluster of processing nodes, and wherein the environment configuration module is configured to respond to the environment creation command by:
creating a namespace for a new environment,
identifying a set of containers needed for the new environment, and
running, in the created namespace, instances of the identified set of containers based on the retrieved container files stored in the cloud computing account, wherein parameters for the containers are set according to the retrieved configuration data stored in the cloud computing account.

17. One or more non-transitory computer-readable media storing instructions that, when executed by the one or more computers, cause the one or more computers to perform operations comprising:
providing, by the one or more computers, a repository comprising (i) deployment tools configured to provide a deployment application programming interface (API) for deploying server environments within a cloud computing account, (ii) a set of container files configured to operate together to provide a server environment when the container files are run as containers, and (iii) configuration data for the container files; and
providing, by the one or more computers, a deployment workflow package to a computing system associated with a customer, wherein the deployment workflow package, when invoked for a cloud computing account of the customer, is configured to:
retrieve the set of container files from the repository over a communication network and store the retrieved set of container files in the cloud computing account of the customer;
retrieve the configuration data from the repository over a communication network and store the retrieved configuration data in the cloud computing account of the customer;
retrieve the deployment tools from the repository over a communication network and store the retrieved deployment tools in the cloud computing account of the customer; and
run the deployment tools, hosted in the cloud computing account of the customer, the deployment tools comprising (i) an API gateway for the deployment API and (ii) a deployment orchestrator module configured to create and manage a cluster of processing nodes according to instructions received through the deployment API.

18. The one or more non-transitory computer-readable media of claim 17, wherein the operations further comprise:
identifying a customer account for the customer; and
changing permissions for the repository to permit the customer account to access contents of the repository.

19. The one or more non-transitory computer-readable media of claim 17, wherein the repository comprises multiple sets of deployment tools or configuration data corresponding to different cloud computing platforms.

20. The one or more non-transitory computer-readable media of claim 17, wherein the deployment tools, when hosted in the cloud computing account of the customer, are configured to create and deploy server environments in the cloud computing account of the customer without granting permissions to access the cloud computing account of the customer.

* * * * *